US006901467B2

(12) United States Patent
Shah et al.

(10) Patent No.: US 6,901,467 B2
(45) Date of Patent: May 31, 2005

(54) ENHANCING A PCI-X SPLIT COMPLETION TRANSACTION BY ALIGNING CACHELINES WITH AN ALLOWABLE DISCONNECT BOUNDARY'S ENDING ADDRESS

(75) Inventors: Paras A. Shah, Houston, TX (US); Timothy K. Waldrop, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 460 days.

(21) Appl. No.: 09/792,867

(22) Filed: Feb. 23, 2001

(65) Prior Publication Data

US 2004/0225774 A1 Nov. 11, 2004

(51) Int. Cl.[7] .............................................. G06F 13/42
(52) U.S. Cl. ........................ 710/106; 710/34; 710/52; 711/140; 711/154
(58) Field of Search ............................... 710/105, 305, 710/306, 310, 311, 319, 56, 52, 314, 106, 34; 711/154, 108, 140

(56) References Cited

U.S. PATENT DOCUMENTS

| | | | |
|---|---|---|---|
| 5,659,713 A | * | 8/1997 | Goodwin et al. ............ 711/157 |
| 5,802,574 A | * | 9/1998 | Atallah et al. .............. 711/144 |
| 5,835,741 A | * | 11/1998 | Elkhoury et al. ............ 710/310 |
| 5,920,732 A | * | 7/1999 | Riddle ........................ 710/56 |
| 6,026,451 A | * | 2/2000 | Sreenivas ................... 710/39 |
| 6,067,585 A | * | 5/2000 | Hoang ........................ 710/11 |
| 6,175,889 B1 | * | 1/2001 | Olarig ........................ 710/309 |
| 6,219,737 B1 | * | 4/2001 | Chen et al. ................. 710/310 |
| 6,425,024 B1 | * | 7/2002 | Kelley et al. ................ 710/56 |
| 8,425,024 | * | 7/2002 | Kelley et al. ................ 710/56 |
| 6,449,677 B1 | * | 9/2002 | Olarig et al. ............... 710/305 |
| 6,557,068 B2 | * | 4/2003 | Riley et al. ................. 710/306 |
| 6,581,141 B1 | * | 6/2003 | Kelley et al. ............... 711/154 |
| 6,591,332 B1 | * | 7/2003 | Swanson et al. ............ 711/108 |
| 6,615,295 B2 | * | 9/2003 | Shah .......................... 710/54 |
| 6,647,454 B1 | * | 11/2003 | Solomon .................... 710/310 |
| 2002/0083189 A1 | * | 6/2002 | Connor ...................... 709/236 |

OTHER PUBLICATIONS

PCI–SIG, "PCI–X Addendum t the PCI Local Bus Specification", Sep. 1999, PCI–SIG, pp2227, 40–41, 77–78.*
Laverty Nwaekwe and Syeed Chowdhury, "PCI–X boosts bus bandwidth to 1 Gbps", May 2000, EDN magazine, http://www.ednmag.com.*
Morris Mano, "Computer System Archetecture", Prentice–Hall, Inc., 2nd Ed., pp497–499.*
Krishnamoorthy Prakash, "An Attempt to Completely Utilize the Bandwidth Capability of PCI–X 133 MHz Devices in a 66 MHz PCI–X Local Bus", 2000, High Performance Computing in the Asia–Pacific Region, 2000. Proceedings. The 4th International Conference.*

* cited by examiner

*Primary Examiner*—Glenn A. Auve
*Assistant Examiner*—Justin King

(57) ABSTRACT

A method for processing a PCI-X transaction in a bridge is disclosed, wherein data is retrieved from a memory device and is stored in a bridge then delivered to a requesting device. The method may comprise the acts of allocating a buffer in the bridge for the PCI-X transaction, retrieving data from a memory device, wherein the data comprises a plurality of cachelines, storing the plurality of cachelines in the buffer, wherein the plurality of cachelines are tracked and marked for delivery as the plurality of cachelines are received in the buffer, and delivering the plurality of cachelines to the requesting device in address order, the plurality of cachelines transmitted to the requesting device when one of the plurality of cachelines in the buffer aligns to an ending address of an allowable disconnect boundary (ADB) and the remaining cachelines are in address order.

39 Claims, 7 Drawing Sheets

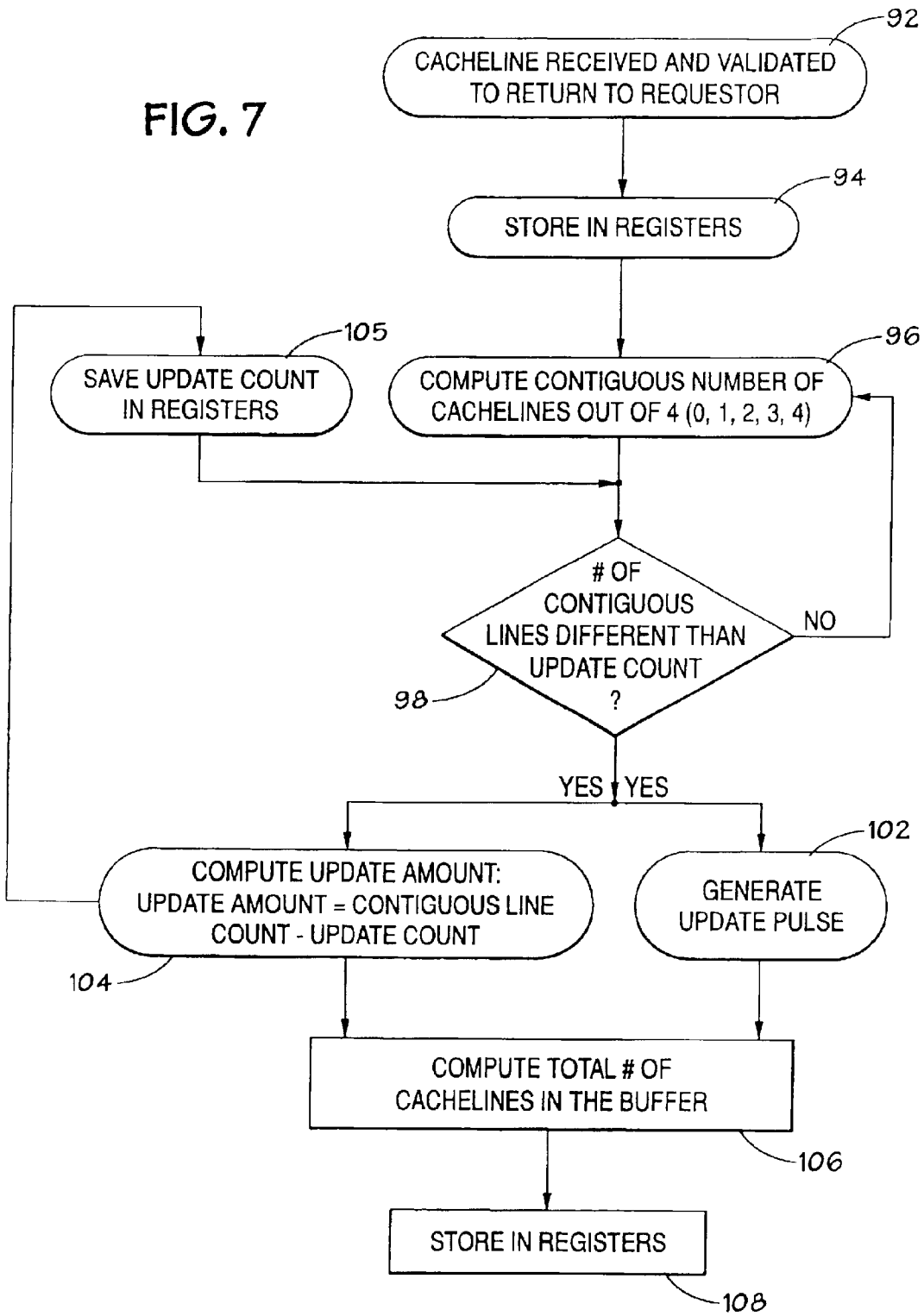

ENHANCING A PCI-X SPLIT COMPLETION TRANSACTION BY ALIGNING CACHELINES WITH AN ALLOWABLE DISCONNECT BOUNDARY'S ENDING ADDRESS

FIELD OF THE INVENTION

The present invention relates generally to a method for completing PCI-X split completion transactions more efficiently. Particularly, the present technique improves the performance of PCI-X split completion transactions by allowing the host bridge to deliver data to the requestor more efficiently.

BACKGROUND OF THE RELATED ART

This section is intended to introduce the reader to various aspects of art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A conventional computer system typically includes one or more central processing units (CPUs) and one or more memory subsystems. Computer systems also typically include peripheral devices for inputting and outputting data. Some common peripheral devices include, for example, monitors, keyboards, printers, modems, hard disk drives, floppy disk drives, and network controllers. The various components of a computer system communicate and transfer data using various buses and other communication channels that interconnect the respective communicating components.

One of the important factors in the performance of a computer system is the speed at which the CPU operates. Generally, the faster the CPU operates, the faster the computer system can complete a designated task. One method of increasing the speed of a computer is using multiple CPUs, commonly known as multiprocessing. With multiple CPUs, tasks may be executed substantially in parallel as opposed to sequentially.

However, the addition of a faster CPU or additional CPUs can result in different increases in performance among different computer systems. Although it is the CPU that executes the algorithms required for performing a designated task, in many cases it is the peripherals that are responsible for providing data to the CPU and storing or outputting the processed data from the CPU. When a CPU attempts to read or write to a peripheral, the CPU often "sets aside" the algorithm that is currently executing and diverts to executing the read/write transaction (also referred to as an input/output transaction or an I/O transaction) for the peripheral. As can be appreciated by those skilled in the art, the length of time that the CPU is diverted is typically dependent on the efficiency of the I/O transaction.

Although a faster CPU may accelerate the execution of an algorithm, a slow or inefficient I/O transaction associated therewith can create a bottleneck in the overall performance of the computer system. As the CPU becomes faster, the amount of time it expends executing algorithms becomes less of a limiting factor compared to the time expended in performing an I/O transaction. Accordingly, the improvement in the performance of the computer system that could theoretically result from the use of a faster CPU or the addition of additional CPUs may become substantially curtailed by the bottleneck created by the I/O transactions. Moreover, it can be readily appreciated that any performance degradation due to such I/O bottlenecks in a single computer system may have a stifling affect on the overall performance of a computer network in which the computer system is disposed.

As CPUs have increased in speed, the logic controlling I/O transactions has evolved to accommodate I/O transactions. Such logic, usually referred to as a "bridge," is typically an application specific integrated circuit (ASIC). Thus, most I/O transactions within a computer system are now largely controlled by these ASICs. For example, Peripheral Component Interconnect (PCI) logic is instilled within buses and bridges to govern I/O transactions between peripheral devices and the CPU.

PCI logic has evolved into the Peripheral Component Interconnect Extended (PCI-X) to form the architectural backbone of the computer system. PCI-X logic has features that improve upon the efficiency of communication between peripheral devices and the CPU. For instance, PCI-X technology increases bus capacity to more than eight times the conventional PCI bus bandwidth. For example, a 133 MB/s system with a 32 bit PCI bus running at 33 MHz is increased to a 1060 MB/s system with the 64 bit PCI bus running at 133 MHz.

An important feature of the new PCI-X logic is that it can provide backward compatibility with PCI enabled devices at both the adapter and system levels. For example, although PCI devices cannot run in PCI-X mode, the bus is still operable in PCI mode. Therefore, even though a PCI-X devices are coupled to the system, if one device operates in PCI mode then all the devices including the PCI-X devices operate according to the PCI specifications.

Additionally, the host bridge in a computer system handles a large amount of transactions such as read and write requests. However, PCI-X logic devices enable a requesting device to make only one data transaction before relinquishing the bus, rather than reissuing the transaction on the bus to poll for a response.

It should be noted that the PCI-X bus may transmit up to 4 kilobytes (KB) per transaction. Once the request is registered within the bridge, the read request transaction is separated into cacheline-sized blocks to resolve cache coherency issues with the processors and so the transaction can be run properly on the I/O Bus 24 in FIG. 1. Typically, when a PCI-X device needs to read a block of data from memory, the requesting device supplies the starting address and a byte count. For bridges that track completion data in units of their request size, higher latency occurs when the starting address is not aligned to the allowable disconnect boundary (ADB). Thus, there is a need for a more efficient method for returning data to the requesting device.

The present invention may address one or more of the problems discussed above.

BRIEF DESCRIPTION OF THE DRAWINGS

The foregoing and other advantages of the invention will become apparent upon reading the following detailed description and upon reference to the drawing in which:

FIGS. 7–9 are flowcharts representing an algorithm performed within a bridge in and exemplary computer system.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
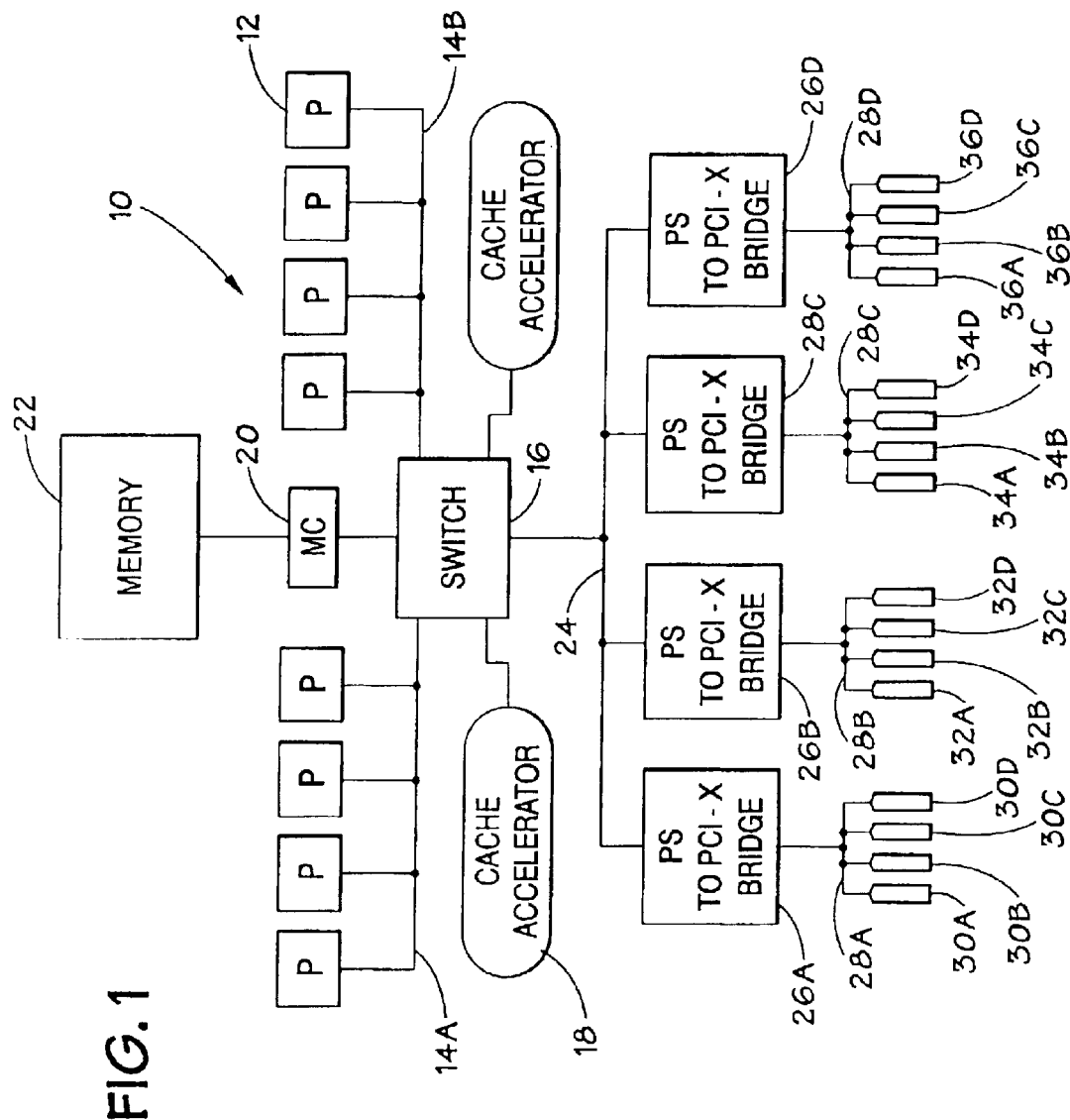
FIG. 1 illustrates a diagram of an exemplary computer system in accordance with the present invention.

Turning now to the drawings, and referring initially to FIG. 1, a multiprocessor computer system, for example a Proliant 8500 PCI-X from Compaq Computer Corporation, is illustrated and designated by the reference numeral 10. Proliant is a trademark of the assignee of the present invention. In this embodiment of the system 10, multiple processors 12 control many of the functions of the system 10. The processors 12 may be, for example, Pentium, Pentium Pro, or Pentium II Xeon (Slot-2) or Pentium III processors available from Intel Corporation. Pentium. Pentium Pro. Pentium II Xeon (Slot-2) and Pentium III are believed to be trademarks of Intel Corporation. However, it should be understood that the number and type of processors are not critical to the technique described herein and are merely being provided by way of example.

Typically, the processors 12 are coupled to one or more processor buses. In this embodiment, half of the processors 12 are coupled to a processor bus 14A, and the other half of the processors 12 are coupled to a processor bus 14B. The processor buses 14A and 14B transmit the transactions between the individual processors 12 and a switch 16. The switch 16 routes signals between the processor buses 14A and 14B, cache accelerator 18, and a memory controller 20. A crossbar switch is shown in this embodiment, however, it should be noted that any suitable type of switch or connection may be used in the operation of the system 10. The memory controller 20 may also be of any type suitable for such a system, such as, a Profusion memory controller. It should be understood that the number and type of memory, switches, memory controllers, and cache accelerators are not critical to the technique described herein and are merely being provided by way of example.

The switch 16 is also coupled to an input/output (I/O) bus 24. As mentioned above, the switch 16 directs data to and from the processors 12 through the processor buses 14A and 14B, as well as the cache accelerator 18 and the memory 22. In addition, data may be transmitted through the I/O bus 24 to one of the PCI-X bridges 26A–D. Each PCI-X bridge 26A–D is coupled to each one of the PCI-X buses 28A–D. Further, each one of the PCI-X buses 28A–D terminates at a series of slots or I/O interfaces 30A–D, 32A–D, 34A–D, 36A–D, to which peripheral devices may be attached. For example, in the present embodiment, PCI-X bridge 26A is coupled to the bus 28A, and the bus 28A is coupled to I/O interfaces 30A–D. It should be noted that the PCI-X bridges 26B–D, buses 28B–D and I/O interfaces 32A–D, 34A–D, 36A–D are similarly coupled.

Generally, each one of the PCI-X bridges 26A–D is an application specific integrated circuit (ASIC). Thus, each one of the PCI-X bridges 26A–D contains logic devices that process input/output transactions. Particularly, the ASIC chip may contain logic devices specifying ordering rules, buffer allocation, and transaction type. Further, logic devices for receiving and delivering data, and for arbitrating access to each of the buses 28A–D may also be implemented within the bridge 26A–D. Additionally, the logic devices may include address and data buffers, as well as arbitration and bus master control logic for the PCI-X buses 28A–D. The PCI-X bridges 26A–D may also include miscellaneous logic devices, such as counters and timers as conventionally present in personal computer systems, as well as an interrupt controller for both the PCI and I/O buses and power management logic.

Typically, a transaction is initiated by a requestor, e.g., a peripheral device, coupled to one of the I/O interfaces 30A–D–36A–D. The transaction is then transmitted to one of the PCI-X buses 28A–D depending on the peripheral device utilized and the location of the I/O interface 30A–D–36A–D. The transaction is then directed towards the appropriate PCI-X bridge 26A–D. Logic devices within the bridge 26A–D allocate a buffer where data may be stored. The transaction is directed towards either the processors 12 or to the memory 22 via the I/O bus 24. If data is requested from the memory 22, then the requested data is retrieved and transmitted to the bridge 26A–D. The retrieved data is typically stored within the allocated buffer of the respective bridge 26A–D. The data remains stored within the buffer until access to the PCI/PCI-X bus 28A–D is granted. The data is then delivered to the requesting device.

In the present embodiment, each one of the buses 28A–D is potentially coupled to five requesting devices, up to four peripheral devices and to one of the bridges 26A–D. It should be noted that only one device may use a particular bus 28A–D to transmit data at any given time. For instance, at any one clock cycle only one of the requesting devices may use the bus 28A–D to transmit data. Thus, when a transaction is requested, the device may have to wait until the bus 28A–D is available for access. It should be further noted that the buses 28A–D may be coupled to additional peripheral devices.

Figure 2:
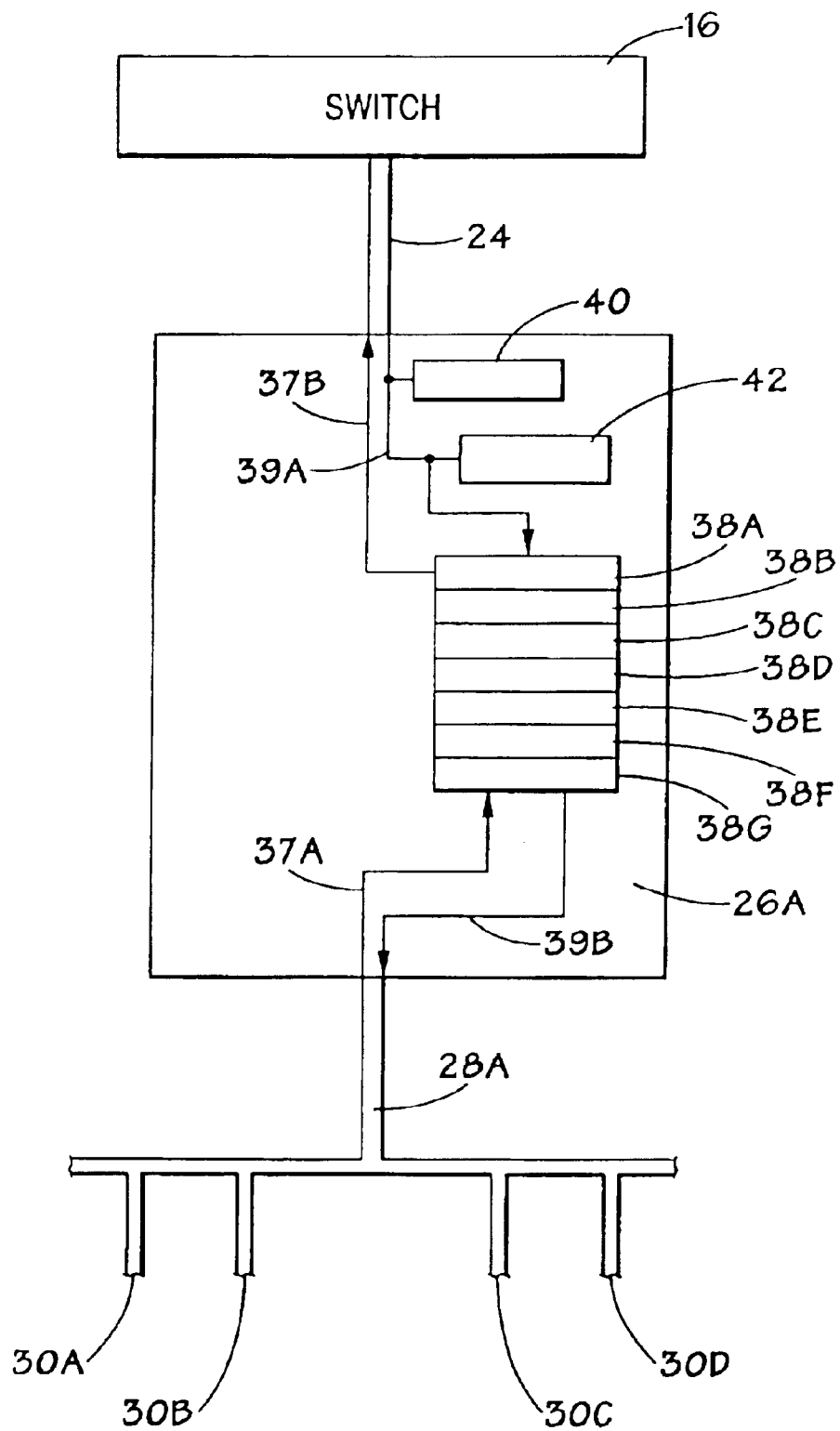
FIG. 2 illustrates certain components of an exemplary bridge in accordance with the present invention.

FIG. 2 illustrates a detailed schematic of the one of the PCI-X bridges 26A in an exemplary computer system. Particularly, FIG. 2 illustrates the PCI/PCI-X bus 28A coupled to the bridge 26A and to the I/O interfaces 30A–D. It should be noted that the PCI/PCI-X bus 28A operates as a bi-directional bus. For example, the bus 28A may transmit data to only one requesting device in one direction at any one clock cycle. Typically, devices that request access to the bus 28A such as the peripheral devices and the bridge 26A are granted access according to a fair arbitration algorithm. Additionally, the bus 28A may only transmit 4 KB or less per request. Therefore, transactions initiating or requesting data in excess of 4 KB may request access to the bus 28A multiple times.

The bridge 26A is an ASIC adapted to perform various functions within the system 10. A transaction signal 37A enters the bridge via the PCI-X bus 28A. In the present embodiment, the bridge 26A is illustrated having a series of buffers 38A–G and logic devices 40, 42. There are typically seven buffers 38A–G configured within each bridge 26A. Although in the present embodiment seven buffers 38A–G are implemented, additional or fewer buffers 38A–G may be implemented in alternative embodiments. It should be noted that an individual buffer 38A–G may store up to 512 bytes. Thus, the series of buffers 32A–G may store up to 3584 bytes of data. It should be further noted that each one of the buffers 32A–G may be modified to improve performance. For instance, each one of the buffers 32A–G may be modified to store an additional amount of data. A more detailed description of a single buffer 32A is described in FIG. 4.

The transaction signal 37B is then transmitted from the buffer 38A–G to the I/O bus 24, where the transaction is transmitted to the switch 16. The transaction is processed and data is retrieved and returned to the bridge 26A. It should be understood that the transaction may retrieve data from the memory 22 or the retrieve data from the processors 12. Thus, once the transaction is processed, the data is transmitted to the bridge 26A as an output signal 39A. Further, the processed transaction data is delivered to the requesting device from the bridge 26A as an output signal 39B.

Typically, the bridge 26A contains numerous logic devices to perform defined operations. For example, logic devices may be designed to adjust frequency variation, perform arbitration algorithms, as well as deliver data efficiently. In the present embodiment, receiving logic device 40 and transmitting logic device 42 are illustrated as individual logic blocks. However, multiple logic devices may be implemented within the receiving logic device 40 and the transmitting logic device 42 to perform the present technique. The receiving logic device 40 operates to track and mark the retrieved data. The receiving logic device 40 also operates to compute the amount of data stored in the buffer 38A–G. The transmitting logic device 42 tracks the amount of data already delivered to the specific peripheral device. Further, the transmitting logic device 42 initiates the delivery of the remaining data to the requesting devices. A more detailed description regarding the components of the receiving logic device 40 and the transmitting logic device 42 will be discussed with reference to FIG. 5.

The bridge 26A is also illustrated coupled to an I/O bus 24. As mentioned above, the I/O bus 24 is illustrated coupled to the switch 16. The I/O bus 24, as in the present embodiment, is generally a pipelined bus. The I/O bus 24 may transmit up to 32 bytes per cycle. As a result, four 32-byte cycles are required to transmit 128 bytes of data on the I/O bus 24. Additionally, multiple transactions may be transmitted simultaneously within the I/O bus 24.

Figure 3:
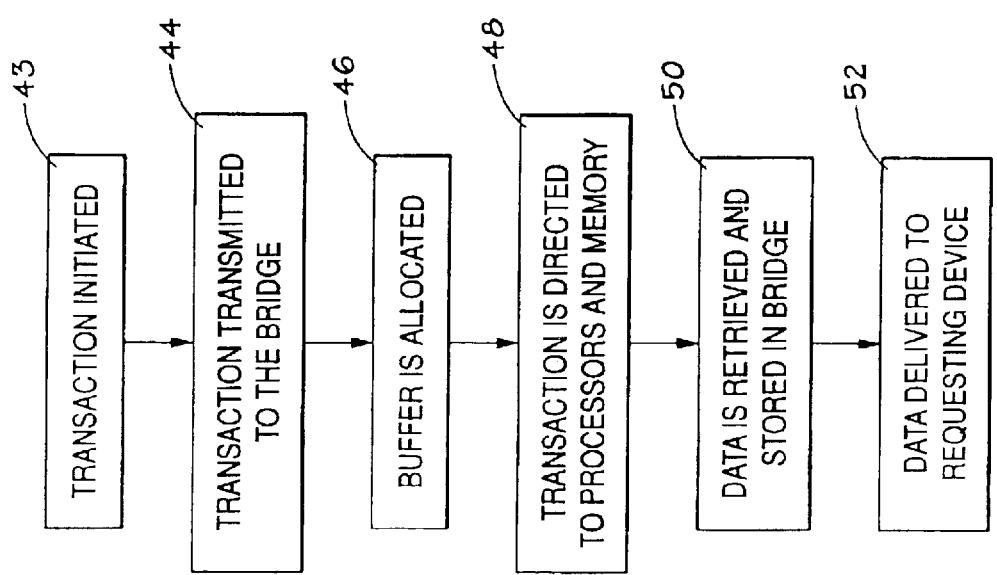
FIG. 3 is a flowchart representing a method for processing a transaction in an exemplary computer system.

FIG. 3 is a flowchart illustrating the steps in processing a transaction initiated by a peripheral device in an exemplary computer system 10. A transaction request is typically initiated by a requestor (step 43), e.g., a peripheral device, coupled to one of the I/O interfaces 30A–D, 32A–D, 34A–D, 36A–D. For ease of explanation, the transaction will be described with reference to the bridge 26A illustrated in FIG. 2 with the understanding that all of the bridges 26A–D will typically operate in a similar manner. The transaction request is transmitted to the PCI-X bus 28A depending on the peripheral device utilized. For example, bus 28A may be coupled to potentially five requesting devices, four peripheral devices and the bridge 26A. However, only one device may gain access to the bus 28A at any one clock cycle. Therefore, the requesting device may have to wait for access to the bus 28A, until it becomes available for use. Once the bus 28A is available, the transaction request is transmitted to the PCI-X bridge 26A (step 44). It should be noted that one of the buffers 38A–G is allocated for the transaction at the time the transaction request is initiated (step 46). Next, the transaction request is directed towards either the processors 12 or the memory 22 (step 48). If data is requested, then the transaction data is returned from the memory 22 as cachelines to the respective bridge 26A. The cachelines are stored within the bridge 26A, until the process for delivering the data is initiated (step 50). Next, the data is returned to the requesting device (step 52).

Figure 4:
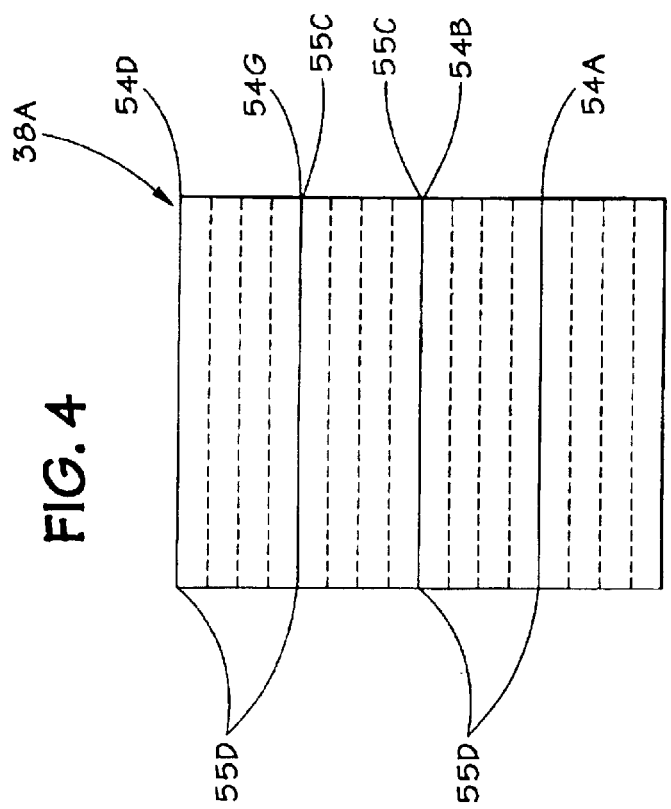
FIG. 4 illustrates a data storage buffer in an exemplary computer system.

FIG. 4 illustrates a detailed view of one of the buffers, such as the buffer 38A implemented within each one of the bridges 26A of an exemplary computer system 10. It should be noted that the buffer 38A may store up to 512 bytes of data. Typically, data is stored within the buffer 38A as cachelines. As mentioned above, each cacheline of data comprises 32 bytes. Thus, 16 cachelines may be stored within a single buffer 38A. The cachelines of data may be stored at any address with the buffer 38A. Additionally, it should be understood that PCI-X specifications require that data may only be delivered in units of allowable disconnect boundary delimited quanta (ADQ). Although in the present embodiment the buffer 38A is illustrated containing four ADQs 54A–D, an additional ADQ may be present if a cacheline is not stored at a starting address of an ADB. Typically, an ADQ 55A–D comprises data between two adjacent ADBs. In the present embodiment, four cachelines are illustrated comprising each one of the ADQs 55A–D. Therefore, in the present embodiment, the fourth cacheline aligns with the ADB 54A. Thus, the data from the ADQ 55A may be delivered to the requesting device. However, if the starting address of a cacheline begins in the middle of one of the ADQs 55A–D, then a fewer number of cachelines may be needed to reach the next highest ADB 54A–D. It should be noted that before delivery is initiated from the buffer 26A, the cachelines within the ADQ 55A–D is required to be in address order. Additionally, each ADQ 55A–D may comprise of more or less cachelines of data, even though the present embodiment illustrates an ADQ comprises four cachelines. Further, each ADQ 55A–D may also vary from one to the next, for instance, the first ADQ 55A may comprise 3 cachelines, and the second ADQ 55B may comprise of 4 cachelines, until the buffer 38A contains 16 cachelines. Thus, the present embodiment should not be a seen as limiting the ADQ 55A–D.

The PCI-X specification requires that the data delivered to the requesting device is to be in address order. If the starting address of a particular cacheline is aligned to the starting address of an ADB 54A–D, then delivery of the cachelines of data is not initiated until at least four cachelines are stored in the buffer 38A. However, the present technique enables delivery of data when less than four cacheline are stored in the buffer 38A. The present technique initiates the delivery of the cachelines, if the address of a retrieved cacheline is aligned with an ADB 54A–D and if the cachelines within the allowable disconnect boundary delimited quanta (ADQ) 55A are stored in address order within the bridge 26A.

It should be noted that data may be received in the bridge 26A at various times, because the I/O bus 24A may operate up to four independent cycles simultaneously for a single transaction. If the cachelines are received from the I/O bus 24 out of address order, then the delivery process is not initiated. The delivery of the data may be initiated, if all the cachelines within an ADQ 55A are in address order, and if the address of the cacheline with the highest address aligns with the ADB 54A. It should be further noted, that as the buffer 38A receives the cachelines of data, earlier stored data within the buffer 38A may be simultaneously delivered to the peripheral device.

As mentioned above, the requesting device may receive up to 4K bytes for each transaction on each one of the PCI/PCI-X buses 28A–D. Therefore, to compensate for the difference in the amount of data stored within the buffer and the requested amount of data, each one of the bridges 26A–D may operate up to four cycles to retrieve data. Although the data may be retrieved from the memory 22 during different clock cycles, the requested data may be delivered to the peripheral devices from the buffer 38A–G simultaneously. As mentioned above, cachelines may be delivered at an address different than the starting address of the ADB 54A. Therefore, two cachelines may be sufficient for delivering the data from that ADQ 55A. In the present embodiment, the address order is maintained because the logic device 40 tracks and marks the retrieved cachelines as they are received in the bridge 26A–D. The logic devices implemented within the bridge 26A–D will be discussed in further detail with reference to FIG. 5.

Typically, cachelines are transmitted to the buffer 38A randomly, because the I/O bus 24, unlike the PCI/PCI-X bus 28A, may operate more than one cycle simultaneously. Additionally, the bridge 26A waits until the cachelines are retrieved before delivering the data to the requesting device in address order. For example, cachelines with an address of 1,3, and 4 may be retrieved and stored in the buffer 38A within a particular ADQ 55A–D. However, the cachelines of data may not be delivered until all the cachelines within the ADQ 55A–D are in address order. Thus, the cachelines will not be delivered until cacheline 2 is received within the buffer 38A. It should be noted that even though PCI-X specifications require that the data be delivered in address order, the present technique may be implemented for specifications that do not require data in address order.

As can be appreciated by those skilled in the art, when a new transaction is initiated by a requesting device, the registers within the bridge 26A are reset to their corresponding default values. It should also be mentioned that the highest valid address typically corresponds to the cacheline having the highest address in the particular buffer 38A. For instance, the buffer 38A comprising a plurality of cachelines has a cacheline with the highest valid address. As each ascending cacheline is received from the memory 22, that cacheline then has the highest valid address and so on. Thus, as will be discussed further, the present technique incorporates logic devices to compute the cacheline with the highest valid address. The technique then utilizes that information along with the total amount of data stored within the buffer to initiate delivery of the data.

Figure 5:
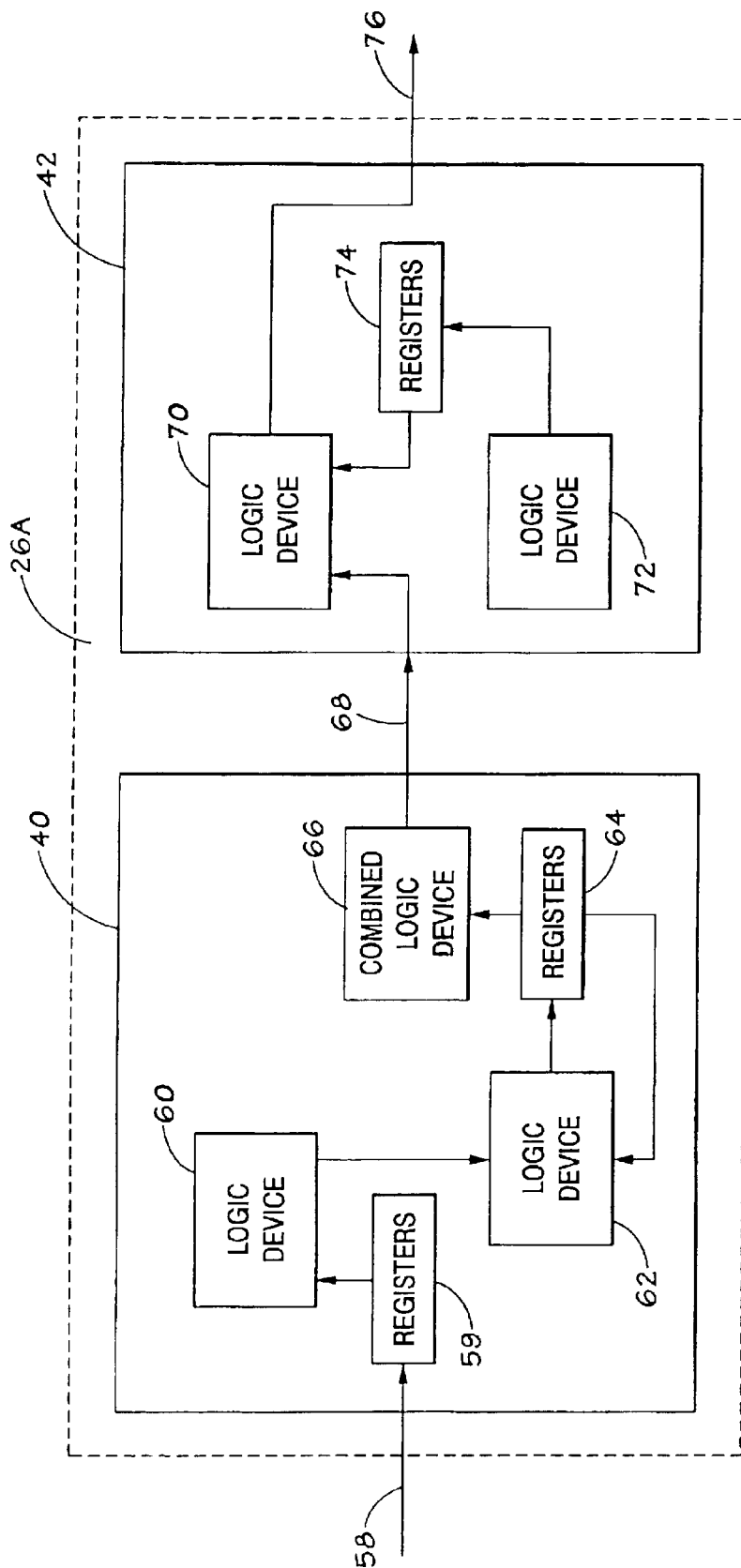
FIG. 5 illustrates a block diagram incorporating logic devices in an exemplary computer system.

FIG. 5 illustrates logic devices implemented within each one of the bridges 26A–D to enhance the performance of a PCI-X split completion transaction. As mentioned above, data is retrieved from the memory 22 as cachelines and entered into one of the bridges 26A. Within the bridge 26A, cachelines are stored in the buffer 38A. It should be noted that buffers 38B–G are utilized in a similar manner as buffer 38A. An entry 58 is input into receiving logic device 40 signaling that validated cachelines of data have been received. A bank of registers 59 stores the entry 58 and transmits the entry 58 to logic block 60. Logic block 60 maintains a record of each one of the cachelines 56A–D that are retrieved from the memory 22. Particularly, the logic block 60 records the address of each new cacheline received and marks the entry 58, signifying that the cacheline may be returned to the requesting device. It should be noted that logic block 60 generates an update pulse indicating the total number of cachelines received in the buffer 38A from the processors 12 or the memory 22. Further, each one of the cachelines is tracked individually within logic device 60. Thus, the logic block 60 may also process cachelines returning out of address order. In these cases, logic block 60 produces a signal that is transmitted to the logic block 62, indicating that a missing cacheline has been received. A missing cacheline may be defined as a cacheline that is received to complete an ADQ 55A–D or to complete a set of cachelines so that the cachelines are in address order and the highest cacheline aligns to an ADB 54A–D.

The logic block 62 is also disposed within the receiving logic device 40. The logic block 62 computes the total number of cachelines stored in the buffer 38A. Particularly, the logic block 62 utilizes the update pulse generated by the logic block 60 to determine the number of valid cachelines in the buffer 38A. The information regarding the number of valid cachelines is stored in a series of registers 64. The stored information is utilized to compute the new number of cachelines as new cachelines are received in the buffer 38A. Output from the logic block 62 is also transmitted to the logic block 66, where the cacheline with the highest valid address within the buffer 38A is computed. Specifically, logic block 66 functions to calculate the highest address in the buffer 38A that contains valid data. It should be noted that if the highest valid address is at least one ADB higher than the address of the last data returned to the requestor, then a split completion cycle can be initiated. Once the highest address in the buffer containing valid data is determined by logic block 66, the information may be transmitted as a signal 68 to the transmitting logic 42.

In the present embodiment, the transmitting logic device 42 maintains a series of logic blocks and registers, which are utilized in facilitating the delivery of the transaction data to the requesting device. The logic block 70 receives the signal 68 from the receiving logic device 40. Particularly, the logic block 70 receives the signal 68 regarding the highest address with valid data in the buffer 38A. Further, the logic block 70 utilizes the signal 68 to determine whether the next delivery of data should be initiated. More particularly, if the highest valid address containing data in the buffer 38A is at least one ADB higher than the address of the last cacheline delivered to the requestor from the buffer 38A, then logic block 70 can request access to the bus 28A–D for delivery to the peripheral device. The logic block 72 monitors the current position of the highest valid address within the buffer 38A. Further, the logic block 72 transmits this information to a series of registers 74. The information stored in the registers 74 is then utilized by logic block 70. The logic block 70 determines when the data may be delivered. Subsequently, if one of the ADQs 55A–D is full, then the logic block 70 requests access to the bus 28A to complete the split completion transaction 72. It should be noted that because the present technique utilizes a cacheline granularity rather than an ADB granularity, split completions can be generated even when read requests are outstanding on the I/O bus 24. This has the effect of providing a lower latency to the requesting device, which improves both internal queue utilization and bus utilization.

Figure 6:
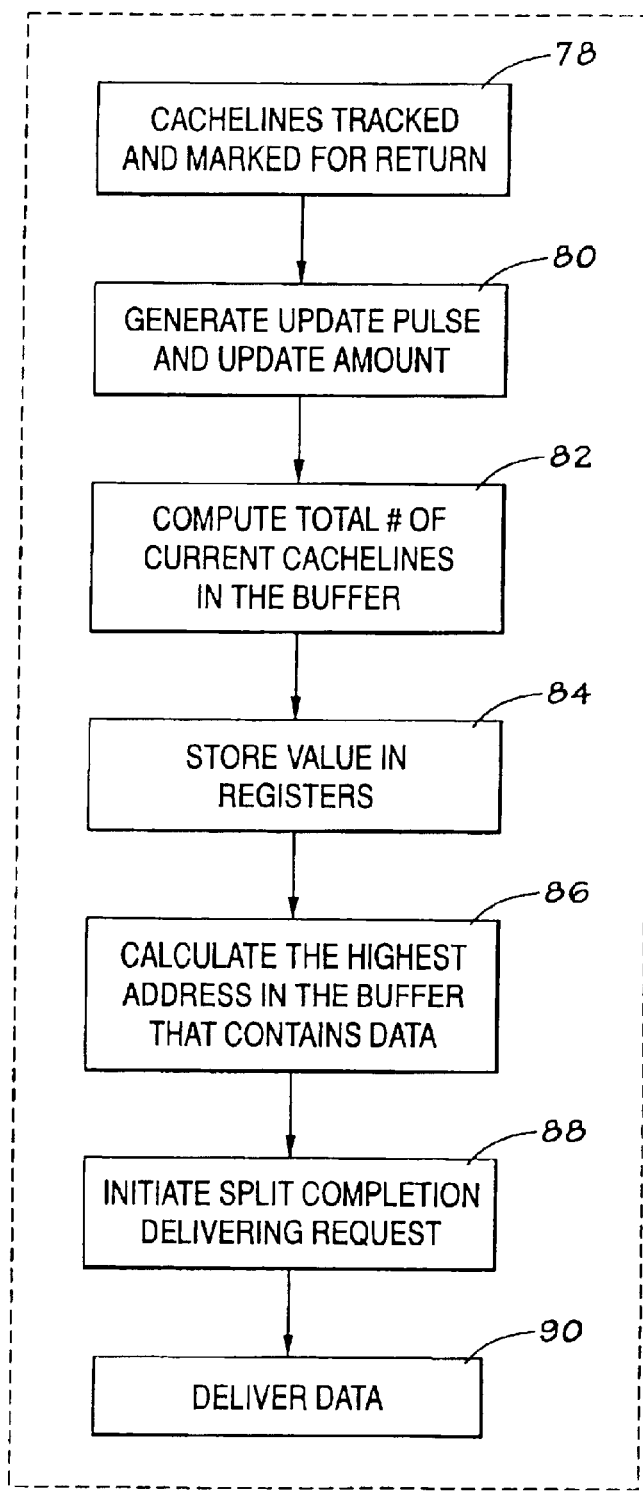
FIG. 6 is a flowchart representing the method for completing a split completion transaction in an exemplary computer system.

FIG. 6 is a flowchart illustrating the method for delivering the retrieved data to the requesting device utilizing the present technique. As mentioned above, cachelines are generally received in the bridge 26A and stored in the buffer 38A. As cachelines are received from the I/O bus 24, logic devices within the bridge 26A track and mark each valid cacheline for return to the requesting device (step 78). It should be noted that the logic device 60 that tracks and marks the individual cacheline entries 54 also generates an update pulse indicating when one or more new contiguous cachelines are received (step 80). Next, the total number of cachelines in the buffer 38A is computed (step 82). The output is then transmitted and saved in a series of registers 64 (step 84). The highest valid address containing data within the buffer 38A is then computed (step 86). Particularly, the logic device 40 computes the highest valid address of data present in the buffer by adding the buffer 38A base address to the number of valid cachelines available within the buffer 38A. It should be noted that, if the highest valid address in the buffer 38A is at least one ADB higher than the address position of the last cacheline delivered to the requestor, then a split completion cycle may be initiated (step 88). Once the transaction data is ready to be delivered, the bridge 26A typically requests access to the bus 28A. When the bus 28A becomes available, the data is delivered to the requesting device (step 90). As mentioned above, split completion transactions may be generated even when read requests are outstanding on the I/O bus 24. This provides a more efficient system because data may be received by the bridge 26A as stored data is delivered to the requesting device, causing a reduction in the latency period.

FIG. 7 is a detailed flowchart representing the functions performed by registers 59 and logic device 60. In the present embodiment, the bank of registers 59 and the logic device 60 keep track of each cacheline of data entered into the bridge 26A. The receiving logic device 40 receives and validates each cacheline entry 58 so that the corresponding cacheline of data may be returned to a requesting device (step 92). Initially, each cacheline entry 58 is received within the bridge 26A and stored in the bank of registers 59 (step 94). Next, the stored entry 58 is transmitted to the logic device 60, so that the number of contiguous cachelines in the buffer 38A may be computed (step 96). Generally, the logic device 38A determines the amount of cachelines that are in address order within the buffer 38A. Particularly, the logic device 60 determines if the number of contiguous cachelines within the buffer 26A is different than an update count (step 98). The update count indicates the number of contiguous cachelines stored within the buffer before the most recent cacheline of data was received by the buffer 38A. If the number of contiguous lines is not different from the update count, then the logic device 60 recomputes the number of contiguous cachelines retrieved (step 96). However, if the update count is different from the number of contiguous cachelines, then an update pulse is generated (step 102). Additionally, an update amount is also calculated, where the update amount is equal to the contiguous cacheline count minus the update count (step 104). The new update amount is used to adjust the update count (step 105). The update count is stored in a plurality of registers within logic device 60.

The logic device 62 calculates the total number of valid cachelines of data in the buffer 38A. Thus, when an update pulse (step 102) and the update amount (step 104) from logic device 60 is received, then the logic block 62 increments the value stored within registers 64 to compute the total number of cachelines in the buffer 38A (step 106). This new computed information is then stored in registers 64 (step 108).

Figure 8:
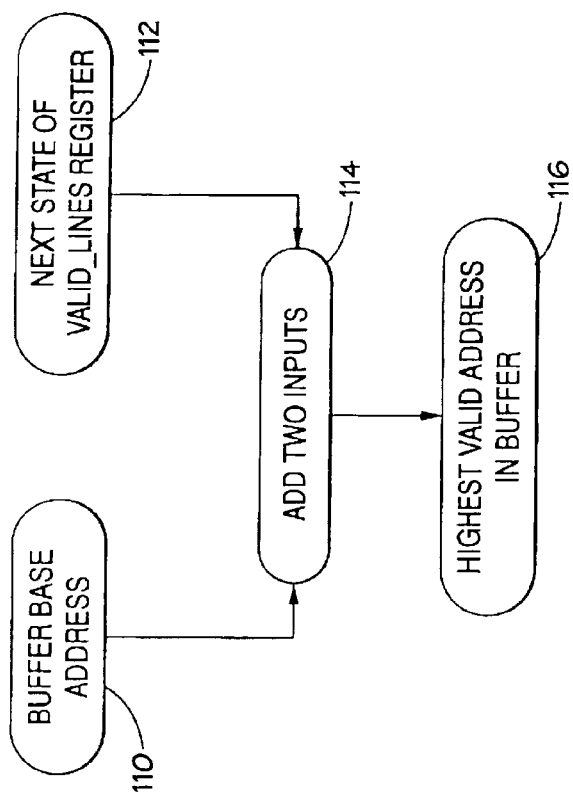

FIG. 8 is a flowchart representing the operations performed by combinational logic device 66. The logic device 66 utilizes the buffer base address (step 110) and the information stored in the registers 64. Particularly, the logic device 66 adds the buffer base address with the values stored within the registers 64 (step 112) to determine the highest valid address in the buffer 38A (step 114). As mentioned above, the signal 68 indicating the highest valid address in the buffer 38A is transmitted to the transmitting logic block 42 (step 116). Particularly, the signal 68 is transmitted to the request generation logic device 70. The logic block 70 and the logic block 72 will be discussed in greater detail with reference to FIG. 9.

Figure 9:
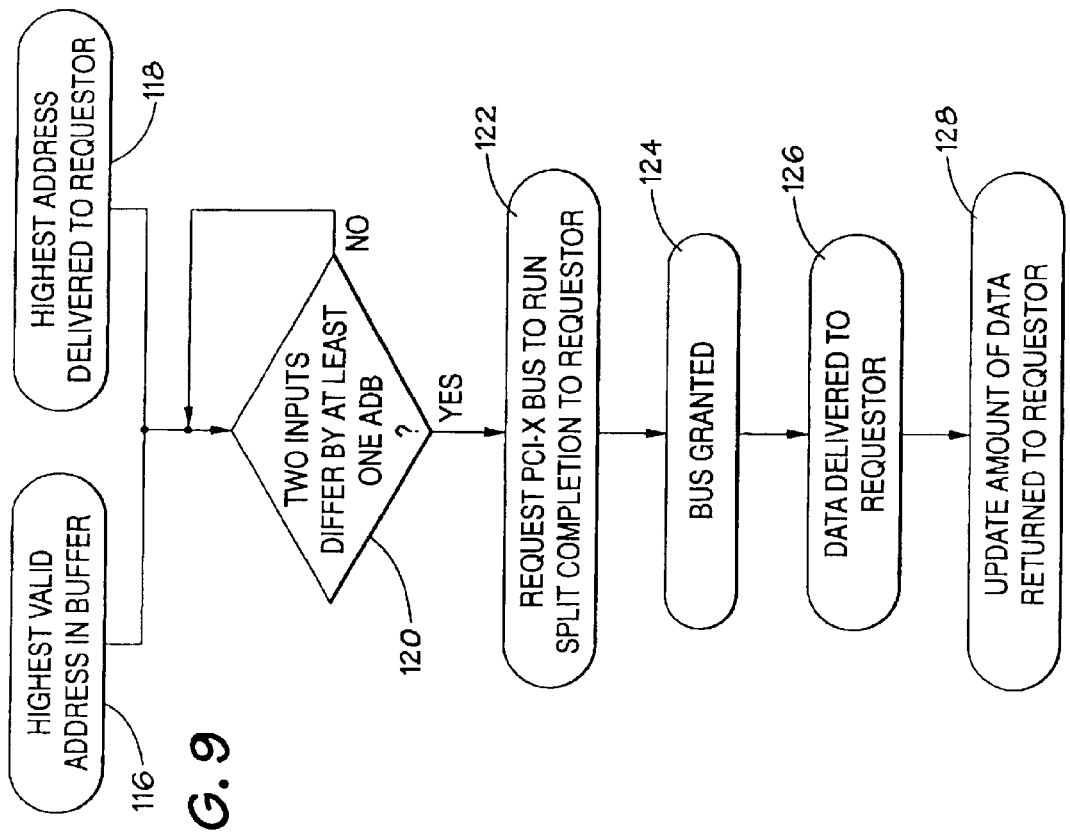

FIG. 9 is a flowchart representing steps performed by logic device 42. More particularly, FIG. 9 represents a flowchart describing the operations of the request generation logic block 70 and the split completion monitoring logic block 72 in greater detail. The request generation logic block 70 utilizes the highest valid address in the buffer 38A (step 116) and the highest address delivered to the requestor (step 118) to determine if two cacheline entries differ by at least one ADB 54A–D (step 120). If the two entries differ by at least one ADB 54A–D, then the request generation logic device 70 transmits a signal indicating request of the PCI-X bus 28A to run the split completion to the requesting device (step 122). Subsequently, the bus 28A is granted (step 124) and the data delivered to the requesting device (step 126). The amount of data delivered to the requestor is noted (step 128) and a signal indicating this is used to update the highest address delivered to the requestor (step 118). Specifically, this new value is utilized to compute the highest address delivered to the requesting device (step 118).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for processing a PCI-X transaction in a bridge, wherein data is retrieved from a memory device and is stored in a bridge then delivered to a requesting device, the method comprising the acts of:
   a) allocating a buffer in the bridge for the PCI-X transaction;
   b) retrieving data from a memory device, wherein the data comprises a plurality of cachelines;
   c) storing the plurality of cachelines in the buffer, wherein the plurality of cachelines are tracked and marked for delivery as the plurality of cachelines are received in the buffer; and
   d) delivering the plurality of cachelines to the requesting device in address order, the plurality of cachelines transmitted to the requesting device when one of the plurality of cachelines in the buffer aligns to an ending address of an allowable disconnect boundary and the remaining cachelines are in address order, wherein the delivery of the plurality of cachelines is performed regardless of whether the plurality of cachelines fill an allowable disconnect boundary delimited quanta.

2. The method as in claim 1, wherein the PCI-X transaction is a PCI-X split completion transaction.

3. The method as in claim 1, wherein the bridge is an ASIC.

4. The method as in claim 1, wherein act (b) comprises transmitting the PCI-X transaction to a plurality of processors.

5. The method as in claim 1, wherein act (c) comprises determining a number of cachelines retrieved from the I/O bus.

6. The method as in claim 1, wherein the allowable disconnect boundary delimited quanta is equal to 128 bytes of data.

7. The method as in claim 1, wherein the cacheline is equal to 32 bytes of data.

8. The method as in claim 1, wherein the buffer comprises a plurality of allowable disconnect boundary delimited quanta.

9. The method as in claim 1, wherein acts (a) through (d) are performed by the bridge.

10. The method as in claim 1, wherein acts (a) through (d) are performed in order recited.

11. A system for processing a PCI-X split completion transaction in a bridge, wherein data retrieved from a memory device is delivered to at least one device coupled to a PCI/PCI-X bus, the system comprising:

means for allocating a buffer in the bridge for the PCI-X split completion transaction;

means for retrieving data from a memory device, wherein the data comprises a plurality of cachelines;

means for storing the plurality of cachelines in the buffer, wherein the plurality of cachelines are tracked and marked for delivery as the plurality of cachelines are received in the buffer; and means for delivering the plurality of cachelines to the at least one device in address order, the plurality of cachelines transmitted to the at least one device when one of the plurality of cachelines in the buffer aligns to an ending address of an allowable disconnect boundary and the remaining cachelines are in address order, wherein the delivery of the plurality of cachelines is performed regardless of whether the plurality of cachelines fill an allowable disconnect boundary delimited quanta.

12. The system as in claim 11, wherein the cacheline is 32 bytes of data.

13. The system as in claim 11, wherein means for delivering comprises means for determining a number of cachelines received from the I/O bus.

14. The system as in claim 11, wherein means for delivering comprises means for determining an address of the cacheline aligned to the ending address of the allowable disconnect boundary in the buffer.

15. The system as in claim 11, wherein means for delivering comprises means for determining the cacheline with the highest valid address in the buffer.

16. The system as in claim 11, wherein the allowable disconnect boundary delimited quanta is equal to 128 bytes of data.

17. The method as in claim 11, wherein the buffer contains 512 bytes.

18. A computer system comprising:
at least one processor;
at least one bridge coupled to the processor;
at least one bus, coupled to the bridge and a plurality of peripheral devices;
a first logic device configured to receive data from a memory device as cachelines, the first logic device enabled to track and mark the cachelines for delivering to the plurality of peripheral devices;
a plurality of buffers adapted to store the cachelines of data temporarily, each buffer having an allowable disconnect boundary delimited quanta marking a position at which data is deliverable, the first logic device tracking and marking the cachelines of data when the cachelines are received in the buffer; and
a second logic device configured to trigger the delivery of cachelines to the plurality of peripheral devices, the second logic device triggering the delivery of the cachelines when an address of a cacheline aligns with an ending address of an allowable disconnect boundary delimited quanta and the cachelines within the allowable disconnect boundary delimited quanta are in address order wherein the delivery of the cachelines is performed regardless of whether the cachelines fill the allowable disconnect boundary delimited quanta.

19. The computers system as in claim 18, wherein the cacheline contains 32 bytes of data.

20. The computer system as in claim 18, wherein allowable disconnect boundary delimited quanta contains 128 bytes of data.

21. The computer system as in claim 18, wherein the buffer contains 512 bytes of data.

22. The computer system as in claim 18, wherein the cachelines are received in the buffer and stored cachelines are delivered to the plurality of peripheral devices simultaneously.

23. The computer system as in claim 18, wherein the first logic device comprises a plurality of registers and logic devices.

24. The computer system as in claim 23, wherein the plurality of registers and logic track and mark the received cachelines.

25. The computer system as in claim 24, wherein the logic devices determine an address of the cacheline received in the buffer.

26. The computer system as in claim 24, wherein the registers store information generated by the logic devices.

27. The computer system as in claim 26, wherein the information is transmitted to the second logic device.

28. The computer system as in claim 27, wherein the second logic device determines a location address for the cacheline with a highest valid address in the buffer.

29. The computer system as in claim 28, wherein the cacheline with the highest valid address in the buffer is utilized to determine whether a cacheline is aligned to the ending address of the allowable disconnect boundary delimited quanta.

30. A method for delivering data to a requesting device from a buffer in a bridge for a PCI-X split completion transaction, the bridge configured to store a plurality of cachelines of data and deliver the plurality of cachelines of data in address order, the method comprising the acts of:

a) receiving the plurality of cachelines in a buffer disposed within the bridge and tracking each of the plurality of cachelines received within the buffer, the buffer adapted to store the plurality of cachelines in allowable disconnect boundary delimited quanta; and b) transmitting the plurality of cachelines to the requesting device in a series, the series containing the plurality of cachelines in address order and at least one of the plurality of cachelines with an address in the allowable disconnect boundary delimited quanta that aligns with an ending address of the allowable disconnect boundary delimited quanta, wherein the delivery of the plurality of cachelines is performed regardless of whether the plurality of cachelines fill the allowable disconnect boundary delimited quanta.

31. The method as in claim 30, wherein tracking the plurality of cachelines comprises storing an address associated with the plurality of cachelines in a plurality of registers.

32. The method as in claim 30, wherein tracking the plurality of cachelines comprises marking the plurality of cachelines for delivery to the requesting device.

33. The method as in claim 30, wherein act (b) comprises determining the address order of the plurality of cachelines.

34. The method as in claim 33, wherein determining the address order of the plurality of cachelines comprises determining an address of each of the plurality of cachelines stored in the buffer.

35. The method as in claim 34, comprises determining amount of cachelines deliverable to the requesting device.

36. The method as in claim 30, wherein the allowable disconnect boundary delimited quanta contains 128 bytes of data.

37. The method as in claim 30, wherein each one of the plurality of cachelines contains 32 bytes of data.

38. The method as in claim 30, wherein stored plurality of cachelines are delivered and new cachelines of data are received simultaneously.

39. The method as in claim 30, wherein the buffer contains four allowable disconnect boundary delimited quanta.

* * * * *

UNITED STATES PATENT AND TRADEMARK OFFICE
CERTIFICATE OF CORRECTION

PATENT NO.        : 6,901,467 B2
APPLICATION NO.   : 09/792867
DATED             : May 31, 2005
INVENTOR(S)       : Paras A. Shah et al.

Page 1 of 1

It is certified that error appears in the above-identified patent and that said Letters Patent is hereby corrected as shown below:

Column 3, line 40, after "Pentium" delete "." and insert therefor --,--

Column 3, line 41, after "Pentium Pro" delete "." and insert therefor --,--

Claim 18, Column 11, line 55, after "order" insert --,--

Signed and Sealed this

Twenty-third Day of June, 2009

JOHN DOLL
*Acting Director of the United States Patent and Trademark Office*